Aug. 11, 1942.   W. F. MOERLINS   2,292,891
SNOW SCOOTER
Filed Dec. 24, 1940
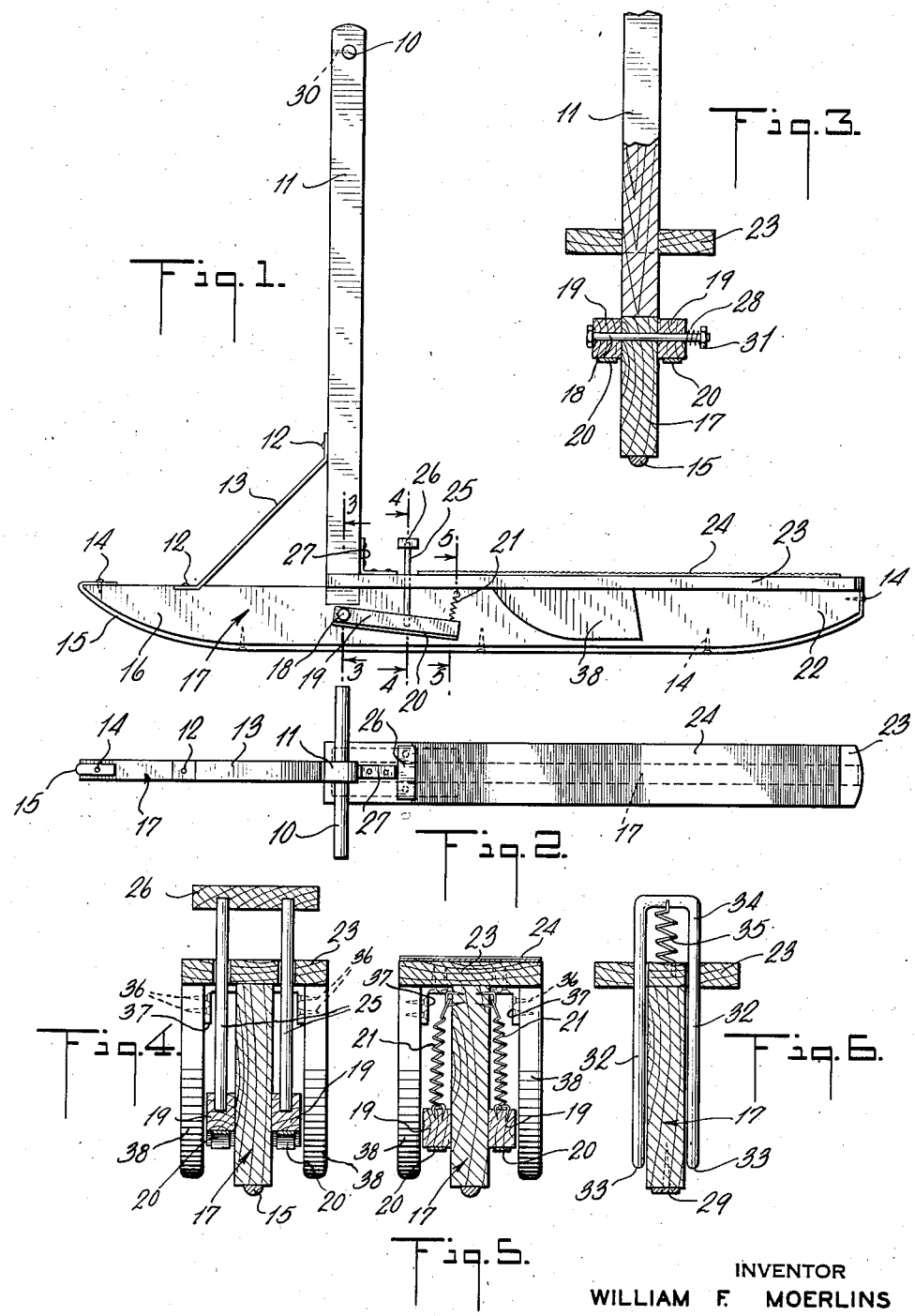
INVENTOR
WILLIAM F. MOERLINS
BY
Charles A. Morton
ATTORNEY Patented Aug. 11, 1942

2,292,891

UNITED STATES PATENT OFFICE 2,292,891

SNOW SCOOTER

William F. Moerlins, Flushing, N. Y.

Application December 24, 1940, Serial No. 371,485

1 Claim. (Cl. 280—23)

This invention relates to improvements in snow scooters and more particularly to the steering and braking mechanism therefor.

One object of this invention is a snow scooter which steers easily.

Another object is a snow scooter which can be stopped safely and in a relatively short distance.

Other objects will appear from the detailed description which follows.

In the drawing comprising but one sheet of six (6) figures, certain embodiments of the invention are set forth.

Fig. 1 is a side elevation of one form of snow scooter.

Fig. 2 is a top plan view thereof.

Figs. 3, 4 and 5 are vertical sectional views taken along the lines 3—3, 4—4, and 5—5, respectively, of Fig. 1.

Fig. 6 is a vertical sectional view of a modified form of brake mechanism.

Like reference characters designate corresponding parts throughout the several figures of the drawing.

The snow scooter consists essentially of a runner 17 preferably made of some light material such as wood having a curved forward end 16 and a curved rear end 22. The bottom face of runner 17 is shod with a metal shoe 15 which is attached to runner 17 at spaced intervals by means of a series of screws 14 preferably countersunk in the shoe 15 to form a smooth surface. As best shown in Figs. 4 and 5, the shoe 15 is substantially semi-circular in cross section, although the semi-circular shoe 15 may be replaced by a flat shoe 29 (Fig. 6).

The runner 17 is notched to receive the squared lower end of a steering post 11. A handle bar 10 passes through a hole in the upper end of the steering post, and may be retained in position in any suitable manner as by means of a pin 30 passing through the steering post into the handle bar. Steering post 11 is braced to runner 17 by means of a metal brace 13 which is secured to the steering post and the runner by means of suitable wood screws 12—12.

A foot platform 23 is attached to the top of runner 17, the forward end of the platform being notched (Fig. 3) to fit around and brace steering post 11. Steering post 11 is further braced by means of the angle iron 27 which is attached by means of wood screws adjacent the base of the steering post 11 and the forward end of platform 23. Platform 23 may be covered with a suitable non-skid covering 24.

The brake mechanism may consist of a pair of brake bars 19—19 (Figs. 4 and 5) pivotally mounted on opposite sides of runner 17 by means of a bolt 18 passing through runner 17 beneath platform 23. The brake bars may be made of any suitable material such as wood or angle iron. In the embodiment shown in Fig. 1 the brake bars 19—19 are indicated as made of wood and when so made each brake bar 19 is shod with a metal brake shoe 20 secured to the brake bar in any preferred manner as by means of wood screws. The brake bars are recessed to receive brake rods 25—25. The brake rods pass through suitable openings in platform 23 and are connected together in any preferred manner as by means of a yoke 26 forming a brake pedal. Foot pressure applied to yoke 26 forces brake rods 25—25 downwards thereby forcing the brake shoes 20—20 of the brake bars 19—19 to engage the snow or ice. As the brake bars 19—19 are rearwardly and downwardly inclined, the trailing edge of brake shoe 20 is first to engage the snow surface, and as the foot pressure upon brake pedal 26 is increased the area of the brake shoes 20—20 engaging the snow increases thereby progressively increasing the braking area and avoiding any sudden jolt due to the braking action. Each brake shoe 20 is provided with a releasing spring 21 which is anchored at one end to the underside of platform 23 and at the other to brake shoe 20.

To insure the free pivotal movement of the brake bars 19—19 upon bolt 18, a coiled spring 28 may be mounted upon bolt 18 between the face of brake bar 19 and the locking nut 31.

The length of the runner 17 will vary from 36 inches for a child's scooter to 60 inches for an adult scooter. The degree of curvature 16 at the front end and the degree of curvature 22 at the rear end of runner 17 will also vary. In a 36 inch runner the curvature at the front end 16 may be 3 inches in 7½ inches; while in a 60 inch runner a curvature of 3 inches in one foot gives good results. In a 36 inch runner the curvature at the rear end 22 may be one inch in 7½ inches; while in a 60 inch runner a curvature at the rear end 22 may be one inch to one foot. The runner 17 is curved at its rear end to enable the operator to turn quickly. This is accomplished by transferring the operator's weight from the center of the platform in the region of steering post 11 towards the rear of the platform in the region of curved end 22 thereby rocking runner 17 upon the curved end 22 thus permitting the operator to make a quick turn. The direction of the turn will be governed by applying the weight to the right or left side of platform 23 causing the runner to turn accordingly.

The wooden brake bars 19—19 may be replaced by brake bars of angle iron, but in the child's snow scooter the wooden brake bars are quite satisfactory and substantially decrease the weight of the scooter as well as the construction cost.

To stabilize the snow scooter a pair of stabilizers 38—38 may be supported beneath the foot platform 23 on opposite sides of runner 17. These stabilizers may be attached to the underside of platform 23 in any suitable manner as by means of the angle irons 37—37 and suitable wood screws 36—36.

To further reduce the construction cost the brake mechanism disclosed in Figs. 1 and 3 to 5 may be replaced by an inverted U shaped metal brake shoe 32 (Fig. 6). Brake shoe 32 passes through suitable openings drilled in platform 23, these openings being drilled in such a position that the prongs of brake shoe 32 straddle runner 17. The tips 33—33 of brake shoe 32 are rounded off so as to eliminate a sudden jolt when the brake is applied. The coiled springs 21 (Fig. 5) may be replaced by an expanded spring 35 which forces brake shoe 32 upwards so as to release the brake shoe when foot pressure is removed from the yoke 34 thereof. The curved shoe 15 (Fig. 3) may be replaced by a flat shoe 29 (Fig. 6), but for high speed the curved shoe 15 is preferable.

What is claimed is:

A snow scooter having but a single runner, said runner being relatively narrow in width, the lower surface of said runner being convex along its longitudinal axis, the lower rear end of said runner also being upwardly curved and tapering towards its rearward extremity to form means for turning said scooter from a straight course, a notch formed in the upper end of said runner forward of its vertical axis, a steering post having its lower end braced in said notch, a platform balanced upon and laterally overhanging said runner on both sides thereof, the front end of said platform being notched to receive the lower end of said steering post and to brace said post against lateral movement, a handle bar attached to the upper end of said steering post, downwardly and rearwardly inclined brake bars disposed upon opposite sides of said runner, a common pivotal mounting for said brake bars journalled in said runner, a common actuator for said brake bars, said actuator comprising an inverted U shaped foot pedal extending through said platform, the wing tips of said U shaped pedal engaging both of said brake bars, said pedal being downwardly operable to simultaneously force both of said brake bars into engagement with the ground surface when foot pressure is applied to the pedal, and coiled springs anchored at one end to the scooter frame and at the other end to the brake bars, said springs being operable in dissipating stored energy to draw said brake bars upwards out of engagement with the ground surface.

WILLIAM F. MOERLINS.